April 14, 1970  D. GABOR ET AL  3,506,952
SONAR SYSTEM EMPLOYING HOLOGRAPHIC TECHNIQUES TO PRODUCE
A PICTURE OF AN OBJECT FIELD
Filed Aug. 30, 1967  2 Sheets-Sheet 1
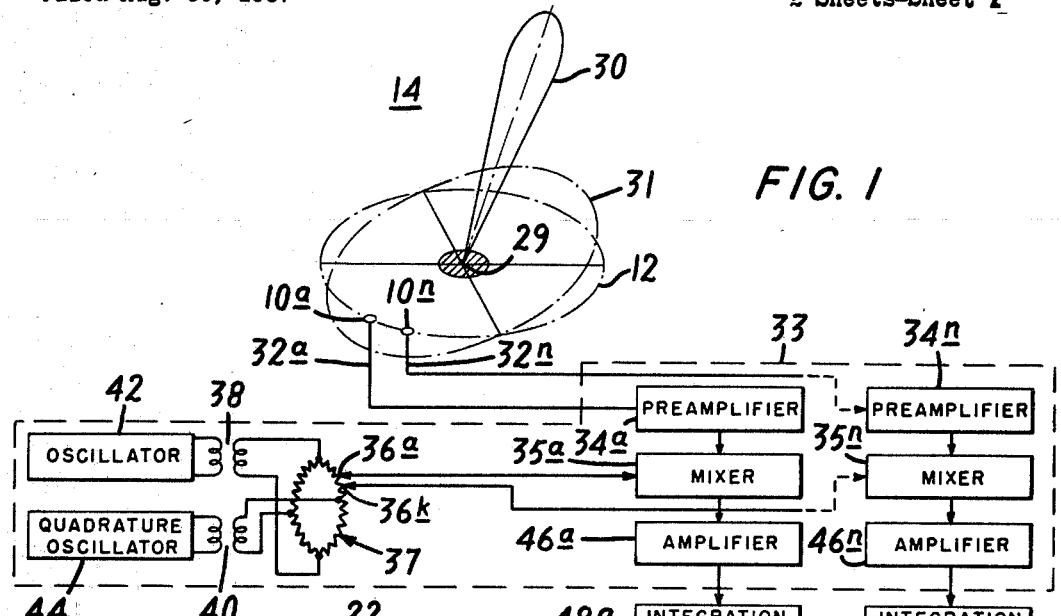
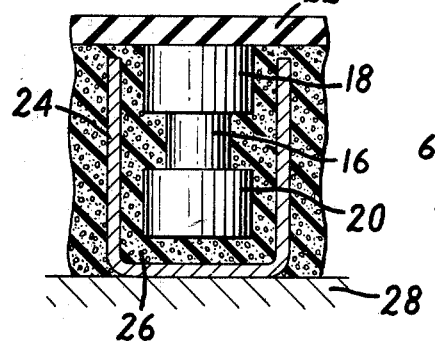
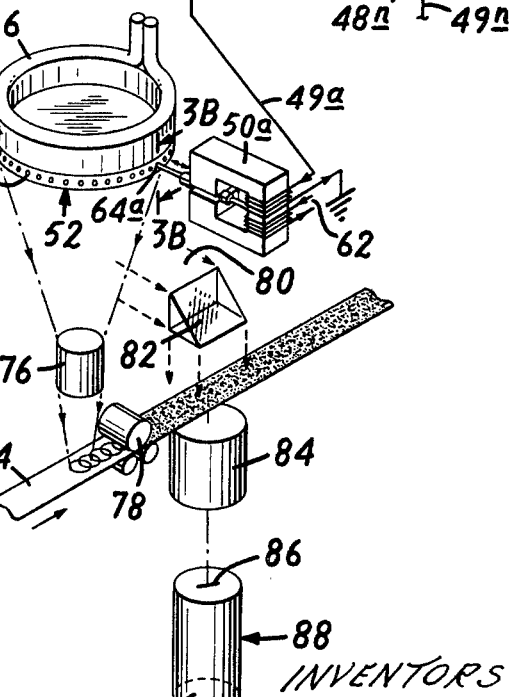
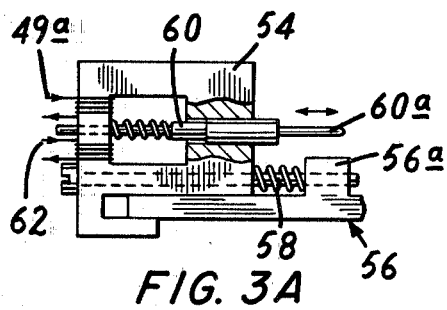
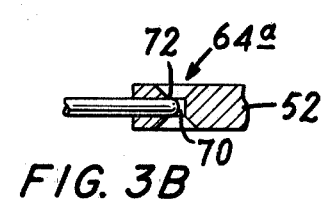
INVENTORS
DENNIS GABOR,
BENJAMIN B. BAUER,
AND FRANK B. GORMAN.
BY
Brumbaugh, Free, Graves & Donohue
his ATTORNEYS

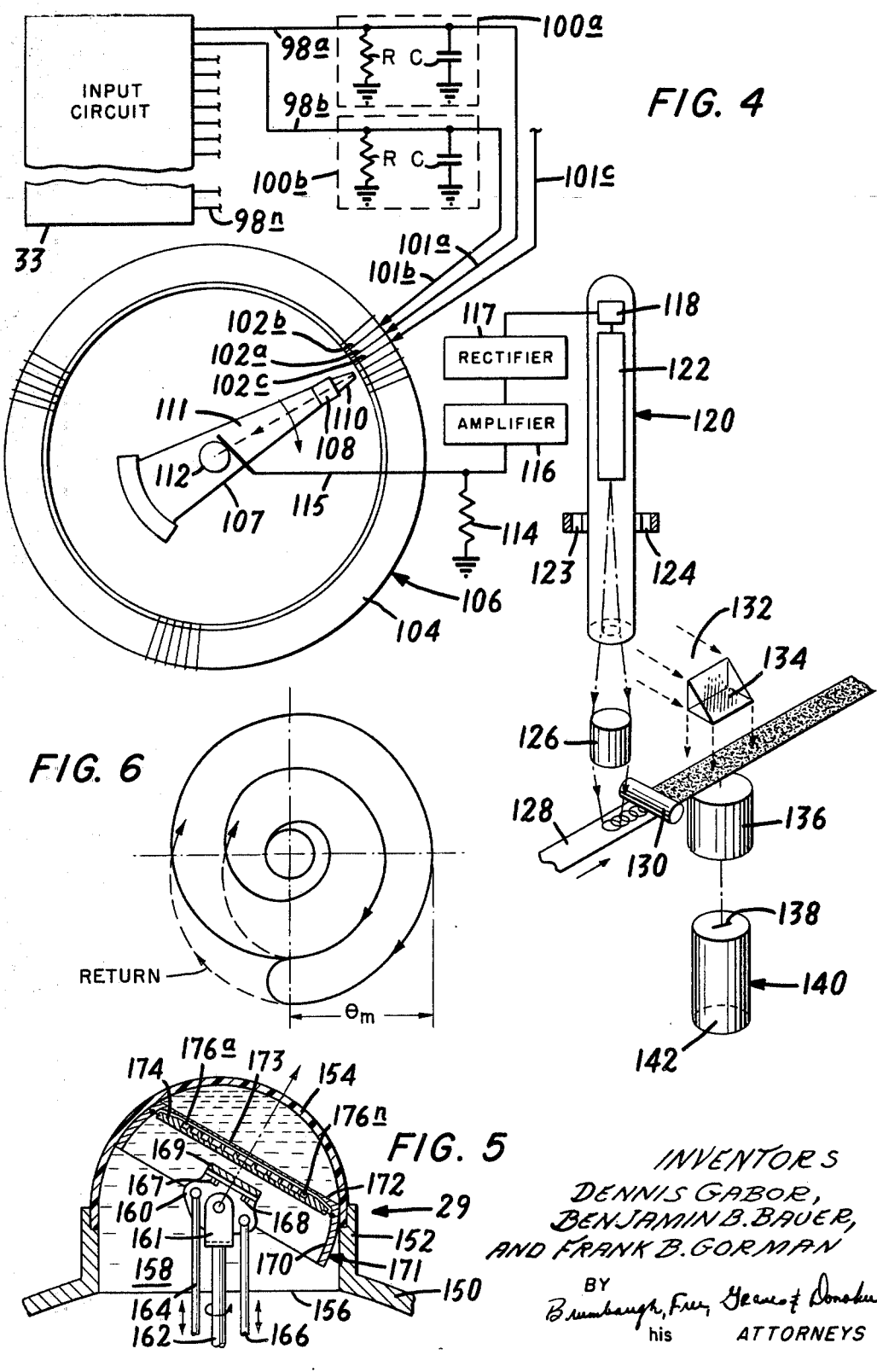

United States Patent Office 3,506,952
Patented Apr. 14, 1970

3,506,952
SONAR SYSTEM EMPLOYING HOLOGRAPHIC TECHNIQUES TO PRODUCE A PICTURE OF AN OBJECT FIELD
Dennis Gabor, London, England, and Benjamin B. Bauer and Frank B. Gorman, Stamford, Conn., assignors to Columbia Broadcasting Systems, Inc., New York, N.Y., a corporation of New York
Filed Aug. 30, 1967, Ser. No. 664,415
Int. Cl. G01s 9/66; G10k 11/00
U.S. Cl. 340—3            13 Claims

ABSTRACT OF THE DISCLOSURE

As described herein, a sonar system employing holographic techniques includes an acoustic wave transmitter which illuminates $\frac{1}{100}$ of an object field each $\frac{1}{100}$ of a second with a narrow beam which is moved to scan the entire field. The reflected waves of 100 object points in each illuminated portion of the object field are sensed by 360 hydrophones which are arranged in a circular array. The output from each hydrophone is amplified and then modulated by a signal corresponding to an equivalent reference sound wave outside the object field and having a frequency equal to the frequency of the transmitted acoustic wave. Each joint signal is then translated into a corresponding light beam for imaging in a corresponding circular array onto an intermittently driven photographic medium with a 1000:1 reduction in scale from the hydrophone array. The photographic medium is then developed and when the images appearing thereon, corresponding to holograms of the entire illuminated object field, are illuminated by a beam of coherent light, a visible picture of the entire object field is reproduced.

BACKGROUND OF THE INVENTION

This invention relates to holography for vision by acoustic waves and, more particularly, to sonar systems employing holographic techniques for obtaining a visual reproduction of an object field scanned by acoustic waves.

In light optical holography, a beam of coherent light generated by a suitable source, such as, a laser, is split into two beams. One beam is reflected from an object and therefore carries a three-dimensional image of the object and the other beam, which is called the "reference" beam, is unaltered. When the image-carrying beam and the reference beam converge on a photographic plate, countless interference patterns are generated on the surface of the plate to produce thereby a hologram. To display the original, three-dimensional image, the photographic plate is developed and thereafter a beam of coherent light is directed onto the developed photographic plate from the direction of the original reference beam. The interference pattern on the plate alters the waves so that the waves emerge with all the directional and brightness characteristics of the original image-carrying beam.

From an understanding of the operation of light optical holography, it can be realized that in the use of holographic techniques in a sonar system to obtain a picture of an object field by sound waves, which is hereinafter referred to as "sonography," it is necessary to produce a sound equivalent of the photographic plate, hereinafter referred to as a sonogram. More particularly, a two-dimensional array of sound intensity receptors must be employed to detect an information carrying sound wave and this must be combined with a known or reference wave to produce a joint intensity wave. It is noteworthy that the number of sound intensity receptors should provide enough information to produce a picture of complicated objects and that the reference wave should fall at some angle outside the field of vision. If, then, the joint intensity wave is translated into a corresponding light beam and this light beam is focused onto a photographic plate at greatly reduced scale, the visible equivalent of the information carrying sound wave can be reproduced by directing a beam of coherent light corresponding to the reference wave onto the photographic plate.

The problems involved in producing the sound equivalent of the hologram are just as recognizable. To produce a picture of complicated objects, such as, for example, the floor of the ocean or many objects which appear simultaneously in a rather wide field, a plurality of sound intensity receptors is required to provide sufficient information. For example, to produce a picture with a 100 x 100 resolution raster, 10,000 receptors would be required. The use of this many sound intensity receptors is highly impractical. Another problem involves the generation of a reference wave for combination with the information carrying sound waves in order to provide a joint intensity wave. Also problemsome are the translation of the joint intensity wave into a corresponding beam of coherent light and the development of a photographic plate substantially at the same time the interference patterns are formed on the photographic plate.

SUMMARY OF THE INVENTION

Accordingly, it is an object of the present invention to provide a sonar system employing holographic techniques for producing a picture of an object field by acoustic waves which overcomes the above-mentioned problems.

It is another object of the present invention to provide a sonar system employing holographic techniques for producing a picture of complicated objects by sound waves with a minimum of sound intensity receptors.

These and other objects of the present invention are obtained by providing a sonar system which includes acoustic wave transmitting device for scanning an object field and a plurality of sound intensity receptors disposed in a selected array responsive to the sound waves reflected from objects in each scanned portion of the object field for developing voltage signals. The voltage signals from each receptor are preferably modulated by a reference signal simulating a reference acoustic wave received from a location outside the scanned object field. Each signal is then translated into a beam of light correspondingly positioned in a similar array for imaging onto a photographic medium at reduced scale. Thereupon, the medium is developed and the images appearing thereon which correspond to the entire object field are reconstructed by holographic techniques.

In one embodiment of the invention, each receptor signal is supplied to a light modulator which controls the exposure of the photographic medium by a beam of light. The photographic medium is then developed and subsequently illuminated by a beam of coherent light to provide a picture of the entire object field. In another embodiment of the invention, each signal is translated into a high frequency voltage signal and supplied to a cathode ray tube which sequentially displays each scanned portion of the object field. Each displayed portion is imaged onto a photographic medium, as above described, and thereafter the photographic medium is developed and subsequently illuminated by a beam of coherent light to provide a picture of the entire object field.

BRIEF DESCRIPTION OF THE DRAWING

In the drawings:
FIGURE 1 is a schematic block diagram of one embodiment of an illustrative sonar system arranged according to the present invention;

FIGURE 2 is a view in section of a typical hydrophone employed in the sonar system of FIGURE 1 arranged according to the present invention;

FIGURE 3A is a side view, partly broken away, of a typical magnetic actuator employed in the sonar system of FIGURE 1;

FIGURE 3B is a view in section of the light modulating ring employed in the sonar system of FIGURE 1 taken along line 3B—3B and looking in the direction of the arrows;

FIGURE 4 is a schematic block diagram of an alternative arrangement for converting the signals developed by the hydrophones of the sonar system of FIGURE 1 into a corresponding light picture;

FIGURE 5 is a schematic diagram of Gaussian emitter for use as the acoustic wave transmitter in the sonar system of FIGURE 1 arranged according to the invention; and FIGURE 6 is a graphic representation of the spiral scanning implemented by the Gaussian emitter illustrated in FIGURE 5.

DESCRIPTION OF THE PREFERRED EMBODIMENTS

In a representative sonar system employing holographic techniques to produce a picture of an object field by acoustic waves, as shown in FIGURE 1, a plurality of sound intensity receptors $10a \ldots 10n$, which may be hydrophones, are arranged in a circular array 12 and are disposed such that each hydrophone faces an object field 14. Depending upon the application of the present invention, the hydrophones $10a \ldots 10n$ may be secured, for example, to the forward end of a submerged vessel such as a bathysphere. As is known, hydrophones are responsive to acoustic waves and derive voltage signals corresponding to the intensity of the acoustic waves. A typical hydrophone arranged according to the invention is illustrated in FIGURE 2.

As shown in FIGURE 2, each hydrophone includes a cylindrical piezoelectric crystal 16, which may be, for example, the lead zirconate piezo-ceramic material manufactured by the Brush-Clevite Company. Affixed to the opposite ends of the crystal 16 are a pair of cylindrical steel members 18 and 20 which act as the contacts for the voltage signals developed across the crystal 16. The other end of the cylindrical member 18 is secured to a rubber sheet 22 which is matched to the wave transmitting medium, i.e., water. The crystal 16 and the steel members 18 and 20 are encapsulated by a cartridge 24 and are suspended in foam rubber 26 which has negligible wave impedance.

The cartridge 24, which may be, for example, formed of plastic, is affixed to a steel base plate 28 which, as can be understood, has a circular configuration and is affixed to al the hydrophone cartridges. The foam rubber 26 supporting the crystal 16 and the cylindrical contacts 18 and 20 is further disposed between the walls of adjacent hydrophone cartridges. Because, as will be explained later on, the spacing of two adjacent hydrophones is about one-half a wavelength, the maximum diameter for each cartridge is also one-half the wavelength of the transmitted acoustic wave. Accordingly, for a transmitted acoustic wave having a frequency of 20 kilocycles per second (kc./s.), one-half a wavelength in water is 3.75 centimeters. The diameter of the cartridges can be increased by a factor of $\sqrt{2}$ if all the hydrophones are interlaced in alternate rows, as is understandable.

Referring again to FIGURE 1, displaced from the hydrophones $10a \ldots 10n$ and disposed, for example, at the forwardmost tip of a submerged vessel, is an acoustic wave transmitter 29 which emits a narrow acoustic wave beam 30 for scanning the object field 14. The transmitter 29, which may be of the Gaussian emitter type, is described in greater detail hereinafter and rotates at a velocity of two and one-half revolutions a second and nutates so that the transmitter spirally scans the object fields 14. For long scanning ranges, the frequency of the transmitted acoustic wave 30 may approximate 20 kc./s. and for short scanning ranges, the frequency of the wave 30 is appreciably greater than 20 kc./s.

Conventionally, to illuminate a particular area of an object field, a point source moving in the focal plane of a parabolic dish or some other sound-optical device is employed. However, because the sound intensity terminates at the circular edge of the parabolic dish, there is a spreading of the transmitted wave over the area around the parabolic dish. The Gaussian emitter overcomes this wave spreading by generating an acoustic wave having the so-called "Gaussian shape." It is well known that the Gaussian shaped wave provides the best product of R.M.S. dish diameter and R.M.S. angular spread of sound intensity. The Gaussian shaped beam 30 illuminates at any one time a solid angle so small that the data within the angle can be simultaneously sensed by a relatively small number of hydrophones. The beam 30 scans the object field 14 with, for example, a cone having a 30° semiangle while its own semiangle is, for example 3°.

By scanning the object field with a narrow acoustic wave rather than illuminating the entire object field with a wide angle beam, the number of hydrophones is greatly reduced. More particularly, the employment of the transmitter 29 which spirally scans the object field 14 is effectively a time division scanning system. Holography, as well as sonography, is not a point-to-point imaging method. All the hydrophones in the ring 12 are responsive to the waves reflected from all the points in the object field 14. To obtain a visual reproduction of a complicated object field, a minimum of 10,000 image points is required. Accordingly, if the beam illuminates at any given time only $\frac{1}{100}$ of the object field 14, which contains a maximum of 100 object points, only the data of 100 points must be recorded by the hydrophones $10a \ldots 10n$. This number of object points can be processed without error, as will be explained hereinbelow. There will, of course, be instances when the waves from more than 100 object points will arrive back simultaneously. This occurs when the object points are at different ranges and will have been illuminated at different times. However, this is a rare occurrence and will not happen when all the object points are at the same distance from the hydrophones.

In a preferred embodiment of the invention, a total of 360 hydrophones are arranged in the ring 12 to respond to the sound waves reflected from 100 objects in each scanned portion of the object field 14. Although 360 hydrophones are responsive to waves reflected by 360 objects, only 100 points, each point in two dimensions, can be accurately located by the hydrophones. To illustrate, assume that the ring 12 has a diameter $d$ and the 360 hydrophones, $10a \ldots 10n$ look into an illuminated cone portion of the object field having a 30° semiangle during each $\frac{1}{100}$ of a second. As will be explained hereinbelow, a reference beam 31, shown in dashed lines and similar to the the "reference" beam employed in light optical holography, is simulated by modulating the output of each hydrophone with a signal having a frequency substantially equal to the frequency of the acoustic wave transmitted by the transmitter 29. The modulating signals are arranged such that they are 30° out-of-phase with the signals developed by the hydrophones and, accordingly, the simulated reference beam 31 is outside the object field 14. In this manner, the modulated output signals from the hydrophones simulate the interference pattern generated on a photographic plate by converging reference and image carrying beams in light optical holography.

The object waves, with the inclusion of the reference beam, will include angles varying from 0° to a maximum of 60°. Dhere the angle is 60°, there will be parallel fringes across the ring 12, the spacing between the fringes being equal to $$\frac{\text{wavelength }(\lambda)}{\sin 30°} = 2\lambda$$

as can be understood. In order to record fringes with a spacing of $2\lambda$, the hydrophones $10a \ldots 10n$ must be spaced so that there are at least two hydrophones for each fringe spacing. In this manner, the maximum points, i.e., where the received object waves and the reference wave augment each other, and the minimum points i.e., where the two waves oppose each other, may be recorded. This requires that the ring 12 comprise $\pi D/\lambda$ hydrophones. Because 60° is only slightly greater than one radian $(360)/(2\pi)$ and the resolution limit is approximately $\lambda/D$, the required number of hydrophones is the number of lines to be resolved across the field which may be, for example, 100, multiplied by $\pi$, or approximately 315 hydrophones. Further, because three hydrophones per fringe are required to record all phases of the object waves, 360 hydrophones are preferred.

As shown in FIGURE 1, the acoustic wave beam 30 emitted by the transmitter 29 scans 1/100 of the object field during each 1/100 of a second and the waves reflected by 100 objects in the scanned portion of the field 14 are sensed by the 360 hydrophones. The voltage signals developed by the hydrophones $10a \ldots 10n$ and corresponding to the intensity of the reflected waves are coupled through a plurality of conductors $32a \ldots 32n$, respectively, to an input circuit 33. Included within the input circuit 33 and connected to the 360 hydrophones $10a \ldots 10n$ are 360 preamplifiers $34a \ldots 34n$ respectively, which amplify the voltage signals and supply the signals to one set of input terminals of 360 mixer circuits $35a \ldots 35n$, respectively. Another set of input terminals of the mixer circuits $35a \ldots 35n$ are connected to 180 center taps $36a \ldots 36k$ which engage 180 corresponding tapping points in a resistive phasor ring 37. The simulated reference wave 31 is produced by the phasor ring 37 which is fed through a pair of matching transformers 38 and 40 by an oscillator 42 and a quadrature oscillator 44, respectively, operating in quadrature. The combined signals appearing at each of the 180 tapping points are 30° out-of-phase with the voltage signals derived by the hydrophones $10a \ldots 10n$. Because of the symmetry of the phasor ring 37, 180 tapping points are sufficient for the 360 mixer circuits and correspondingly, the 360 hydrophones $10a \ldots 10n$. Phasor rings are well known in the art and need not be explained in detail herein.

The frequency of the signals generated by the oscillators 42 and 44 equal the frequency of the transmitted sound wave 30, which may be, for example 20 kc./s. It is noteworthy that the frequency of these signals need not equal the "Doppler" frequency because each object or target point in the object field 14 is scanned in 1/100 of a second. To explain, in most applications of the present invention, the submerged vessel will move, or the targets will move, or both the vessel and the targets will move. If the target moves toward the hydrophones $10a \ldots 10n$, the frequency of the signal reflected off the target and sensed by the hydrophones will be slightly higher than the frequency of the transmitted acoustic wave 30. Specifically, if the target is located at an angle $\theta$ with respect to the hydrophones $10a \ldots 10n$ and moves toward the hydrophones at a velocity $v$, the Doppler frequency $F^1$ may be given as:

$$F^1 = F\left(1 + 2\frac{v}{V}\cos\theta\right)$$

where $F$ is the frequency of the transmitted acoustic wave 30 and $V$ is the velocity of sound in water, i.e., 1500 meters per second.

If then the target moves toward the hydrophones $10a \ldots 10n$ at 7.5 meters per second (15.5 knots), $F=20$ kc./s. and $\theta=0$, the Doppler frequency $F^1$ will equal 20.2 kc./s. This corresponds to a Doppler shift of one percent (1%). Consequently, if a hydrophone looks toward the target for 1/100 of a second, which corresponds to 200 cycles, and the target sends back 202 cycles, the integrated modulation product will go through its first zero at an integration time equal to 100 cycles (0.01 sec). It is, therefore, not necessary to "look at" any one target for more than 100 cycles if targets having up to $\mp 7.5$ meters per second velocities relative to the hydrophones are to be sensed. However, if only the vessel moves and the object points are stationary, as when the bottom of the ocean is scanned, the reference frequency can be made equal to the Doppler frequency, which frequency will then be determined by the relative speed of the vessel.

In the mixer circuits $35a \ldots 35n$, which may be of conventional construction, the voltage signals generated by the hydrophones $10a \ldots 10n$ are added to the out-of-phase reference signals produced by the phasor ring 37. An output signal is then produced by each mixer circuit which is proportional to the joint intensity of the reflected object acoustic wave and the simulated reference acoustic wave. In other words, a signal is produced which is proportional to the square of the sum of the amplitude of the signal produced by an associated hydrophone and the amplitude of the out-of-phase reference signal produced by the phasor ring 37. Each signal is converted into a corresponding light beam as will be described hereinbelow.

As shown in FIGURE 1, further included in the input circuit 33 are 360 power amplifiers $46a \ldots 46n$, respectively, which are connected to the output terminals of the mixer circuits $35a \ldots 35n$, respectively, and amplify the joint intensity signals to thereby provide high current signals. Outside the input circuit 33 and connected to the amplifiers $46a \ldots 46n$ are integration circuits $48a \ldots 48n$. The circuits $48a \ldots 48n$, which may be of conventional construction, integrate the amplified current signals over a time period not longer than the time over which the acoustic beam 30 illuminates each portion of the object field 14, for example, 1/100 of a second. As above described, if the integration time is set for .01 second, objects moving at a relative velocity of 7.5 meters per second can be reproduced. The integration time may be shortened if objects with large Doppler shifts are to be reproduced.

From the integrating circuits $48a \ldots 48n$, the signals are supplied through conductors $49a \ldots 49n$ to 360 magnetic actuators $50a \ldots 50n$, respectively, which control the modulation of light transmitted by a light modulating ring 52. As shown in FIGURE 3A, a typical magnetic actuator comprises a core 54 adjustably mounted on a support member 56 which, although not shown in FIG. 1, is adjacent the light modulating ring 52. The positioning of the core 54 on the member 56 and, accordingly, displacement between the core 54 and the modulating ring 52 is controlled by spring biased adjustable set screw 58. The set screw 58 extends through a corresponding opening formed in the core 54 and threadedly engages a flange 56a formed in the support member 56. Mounted in the magnetic core 54 is a spring biased piston 60 which is terminated by a very thin wire 60a. A steady state current is supplied to a pair of wires 62 wound around the core 54 from a source of constant current (not shown) to magnetize the core 54. The conductor 49a is also connected to the core 54 and wound therearound in series opposition with respect to the current supplied to the wires 62.

Referring to FIGURE 1, the light modulating ring 52 includes 360 microshutters $64a \ldots 64n$ which receive light from a quartz capillary mercury lamp 66 bent into a circle of suitable diameter which may be, for example, 60 millimeters. The mercury lamp 66 produces a very strong beam of light and, because the lamp 66 becomes extremely hot during operation, a quartz tube 68 fitted on a flat surface of the lamp 66 is interposed between the lamp 66 and the light modulating ring 52.

Referring to FIGURE 3B, a typical microshutter 64a formed in the light modulating ring 52 includes a pair of intersecting bores 70 and 72. The diameter of the hole 70 is dimensioned such that the thin wire 60a of the piston 60 fits within the hole and, depending upon its position within the hole cuts off some or all the light transmitted by the lamp 66 through the bore 72. In this regard, the hole 72 includes V-shaped grooves on opposite sides of the hole 70 such that light from the lamp 66 is received at a wide convergence angle.

As above mentioned, current signals supplied from each of the integrating circuits 48a . . . 48n through the conductors 49a . . . 49n to each of the magnetic actuators 50a . . . 50n is proportional to the square of the sum of the amplitudes of the reference and object signals supplied from the input circuit 33. To aid in understanding the invention, this current may be designated as J and the current supplied to the wires 62 (FIG. 3A) from the constant current source (not shown) as $I_o$. The force on the piston 60 is then proportional to:

$$(I_o+J)^2 = I_o^2 + 2I_oJ + J^2$$

The first term, $I_o^2$, is a constant and the last term $J^2$ is negligibly small. The middle term is therefore used for light modulation. The force exerted by this current is translated into a proportional displacement by making it act against the spring biasing the piston 60. The resonant frequency of the spring-piston combination must be in the order of 50–100 cycles per second, as can be appreciated.

The maximum displacement of the piston 60 may be, for example, about 0.5 mm. The displacement between the core 54 and the light modulating ring 52 (FIG. 3A) is adjusted by appropriately setting the set screw 58 such that with $J=0$ and $I_o$ supplied to the wires 62, the wire 60a is positioned within the bore 70 of the microshutter (FIG. 3B) just far enough that none of the light transmitted by the mercury lamp 66 is passed by the associated microshutter. Hence, the amount of light passed by the microshutters 64a . . . 64n is dependent upon the magnitude of the current J. For large values of J, the lateral displacement of the piston 60 will be great and substantially all the light will be transmitted by the associated microshutter. For small values of J, the lateral displacement of the piston will be negligible and only minimal amounts of light will be transmitted. In this manner, the light emitted by the lamp 66 is vibrated or modulated in accordance with the joint intensity of the object acoustic and reference acoustic signals.

As shown in FIGURE 1, the light transmitted by the 360 microshutters 64a . . . 64n are imaged on a photographic medium, here shown as a film strip 74 which may be, for example, a strip of diazo film, through a focusing lens 76. The film strip 74 is incrementally moved by a film strip holder (not shown) so that each portion of the film strip is exposed to the transmitted light. Because of the insensitivity of the diazo film, the light source 66 must be powerful for adequate exposure. This then is the reason of the employment of the mercury lamp 66 The advantages of diazo film are that the film is completely grainless, the film is positive medium and the film can be developed very quickly. Each exposed circle on the film strip 74 constitutes a sound hologram or, as referred to herein, a sonogram.

As can be appreciated, the sonograms imaged on the diazo film strip 74 through the lens 76 must be made as small as possible. More particularly, the ratio between the wavelengths of sound waves and the wave lengths of light waves may be as high as 100,000 to one, for example 7.5 cm. for transmitted sound in water at 20 kc./s. and $0.63 \times 10^{-4}$ cm. for red laser light. In order to obtain the same angles in the visual reproduction of the sonograms as in the original recording by the hydrophones 10a . . . 10n, it would be necessary to make the sonogram diameter 100,000 times smaller than the diameter of the ring 12. For example, if the diameter of the ring 12 is 3 meters, the diameter of each sonogram would be 0.03 millimeter. In the present invention, a compromise is made and the diameter of each sonogram is made between 1.0 and 3.0 millimeters.

As above mentioned, the film strip 74 is incrementally moved to the right as viewed in FIGURE 1, by a film strip holder (not shown). Each increment of movement by the strip 74 may be, for example, 0.5 millimeter and the rate of motion may be 100 increments per second or 50 mm./sec.

To reconstruct the sonogram, the diazo film strip 74 is passed through a network of developing rollers 78, which may be of conventional construction and, accordingly, develop the film. After development, the sonogram circles appear white on a black background, as shown, which is extremely advantageous for a good signal-to-noise ratio. The development region may be kept within an area of 5 to 10 millimeters so that not more than $\frac{1}{10}$ or $\frac{1}{50}$ of a second has to pass before the sonogram can be viewed. The development process may also be carried out by a sponge pair, as is understood in the art. Moreover, if the diazo film is replaced by the "UVI" photographic film manufactured by the E. I. du Pont de Nemours & Co. or the photochromic photographic film manufactured by the American Cyanimid Company, the step of developing the film may be eliminated. This is true because both films can produce photographs without any development process.

As soon as the film strip 74 emerges from the developing rollers 78, the film is illuminated by a laser beam 80 emitted by a laser (not shown). The laser beam 80 is focused through prism 82 onto the developed film 74 at an angle corresponding to the angle of the simulated reference wave 31, as is done in light optical holography. All the sonograms recorded within one-half to one second and corresponding to the entire object field 14 can be viewed simultaneously by means of a telephoto lens 84 which implements the total reconstruction of the object field out of the 100 sonograms presented to it. The lens 84 must have a wide diameter, at least 50 millimeters, and a focal length approximately one meter. The optical reconstruction of the sonograms appears in the rear focal plane of the lens 84, i.e., in the Fourier plane, and is imaged on the photocathode 86 of an image tube 88, there being a coincidence of the rear focal plane of the lens 84 and the photocathode 86. The image tube 88, which may be of conventional construction, comprises a screen 90 and the final reconstructed image of the object field 14 imaged on the photocathode 86 is reproduced on the screen 90.

In operation, the rotating and nutating acoustic wave transmitter 29 emits a narrow acoustic wave beam 30 for scanning the object field 14. Effectively, the beam illuminates $\frac{1}{100}$ of the object field 14 every 10 milliseconds and the data from 100 points in each scanned portion of the object field are recorded by the 360 hydrophones 10a . . . 10n. The hydrophones 10a . . . 10n derive voltage signals which are proportional to the intensity of the sound waves reflected from the 100 objects in the scanned portion of the object field. Each derived voltage signal is supplied to the input circuit 33 wherein it is amplified and supplied to a mixer circuit. In each mixer circuit, each derived voltage signal is modulated by a reference signal which is 30° out-of-phase with each developed signal. The reference signals are produced by the phasor ring 37 and have frequencies equal to the frequency of the transmitted acoustic wave beam 30.

The reference signals supplied from the phasor ring 37 to modulate the signals developed by the hydrophones simulate a reference beam 31, shown by the dashed lines, in order to produce a joint intensity sound wave signal corresponding to the convergence of the image carrying optical waves and the reference wave on the photographic plate in light optical holography. The joint intensity signals from the mixer circuits $35a \ldots 35n$ are amplified by the amplifiers $46a \ldots 46n$, integrated over a period of 10 milliseconds by the integration networks $48a \ldots 48n$ and supplied to the 360 magnetic actuators $50a \ldots 50n$, respectively. The magnetic actuators modulate the light emitted by the mercury lamp 66 which is split into 360 paths by the circularly disposed microshutters $64a \ldots 64n$ in order to produce an image on the photographic film strip 74 in a pattern corresponding to that of the receptors $10a \ldots 10n$.

The modulated light is focused onto the film 74 through the lens 76 at greatly reduced scale and, in this manner, sonograms corresponding to the information in each portion of the scanner object field 14 are recorded on the film 74. Thereupon, the film is developed by the rollers 78 and illuminated by the laser beam 80. All of the sonograms recorded within one second are viewed simultaneously by the telephoto lens 84 having a focal length of one meter. The optical reconstruction of the sonograms appears in the rear focal plane of the lens 78 and is imaged on the photocathode 86 of the image tube 88. The reconstructed image of the object field 14 is then observable on the screen 90 of the image tube 88.

Referring to FIGURE 4, there is shown an alternative embodiment of apparatus for converting the joint intensity signals developed by the input circuit 33 into corresponding light beams. As illustrated in FIGURE 1 and described above, the 360 hydrophones $10a \ldots 10n$ supply to the input circuit 33 voltage signals corresponding to the intensity of the waves reflected off the object points in the object field 14. The joint intensity current signals are supplied from the input circuit 33 through conductors $98a \ldots 98n$ to 360 integrating circuits $100a \ldots 100n$ here shown as comprising conventional R-C circuits. As above described, the time constant for the networks $100a \ldots 100n$ approximate 10 milliseconds and, accordingly, the values of the resistor and capacitor in each circuit are appropriately selected to provide this time constant. The integrating networks $100a \ldots 100n$ are coupled through conductors $101a \ldots 101n$ to 360 segments $102a \ldots 102n$ selectively situated on a stator ring 104 of a selector member 106. The stator ring 104 may, for example, comprise glass which is ground to a very precise radius and the segments $102a \ldots 102n$ may comprise thin wire conductors which terminate the conductors $101a \ldots 101n$ and are wrapped around a substantial part of the stator ring 104. It can be seen that, effectively, the capacitor in each of the integrating networks $100a \ldots 100n$ appears across the ring 104.

The selector member 106 further comprises a reproducing arm 107 which is rotated within the stator ring 104 by a motor source (not shown) at a constant angular velocity, such as, 100 revolutions per second (r.p.s.). The arm 107 includes a piezoelectric crystal 108 and a capacitive pick-up 110 attached to the crystal 108 and contiguous with the stator ring 104. As the arm 107 rotates, the crystal 108, which may be conventional, vibrates the pickup electrode 110 at a selected frequency which may be, for example, 500 kc./s. and at an amplitude of, for example, $10^{-4}$ cm. Consequently, a current signal is induced on the pickup electrode 110 which is proportional to the charge on each segment $102a \ldots 102n$ and, accordingly, to the charge appearing across the capacitor in each of the integrating networks $100a \ldots 100n$. These signals are supplied through a conductor 111 within the arm 107 to a distribution center 112. From the center 112, the signals are supplied across a resistor 114, which may be, for example, 1000 ohms, through a conductor 115.

Voltage signals, in the order of one millivolt, are developed across the resistor 114 and these signals are supplied to an amplifier 116 which amplifies the signals and supplies the signals to a rectifier 117. In turn, the rectifier 117 rectifies the amplified signals and supplies the signals to the grid 118 of a cathode ray tube 120. The cathode ray tube 120 includes a conventional electron gun 122 and a rotating pair of magnetic poles 123 and 124 which rotate around the cathode ray tube 120. The magnetic poles 123 and 124 operate in synchronism with the reproducing arm 107 of the selector member 106 and, accordingly, rotate around the tube 120 at a constant angular velocity, such as, for example, 100 r.p.s. It can be seen, therefore, that the electron beam generated by the gun 122 scans a circle on the face of the cathode ray tube each $\frac{1}{100}$ of a second, the intensity of the components of each reproduced circular image depending upon the amplitude of the joint intensity signals produced by the input circuit 33.

The reproduced circles appearing on the face of the cathode ray tube 120 are imaged through a focusing lens 126 onto a strip of film 128. The film may be photoplastic film. As with the film strip 74 of FIGURE 1, the strip of film 128 is intermittently moved by a film strip holder (not shown) past the lens 126 in increments of 0.5 millimeter and at a rate of 50 millimeters per second. Furthermore, each exposed circle on the film strip 128 constitutes a sonogram of a scanned portion of the object field 14. To reconstruct the sonograms, the photoplastic film strip 128 is passed through a hot zone 130 to develop the film. Thereafter, an approximately 50 mm. portion of the film is illuminated by a laser beam 132 emitted by a laser (not shown). The beam 132 is focused through a prism 134 onto the developed film 128 at an angle corresponding to the angle of the simulated reference beam 31 (FIG. 1). A lens 136 sums up the illuminated sonograms recorded in one second and corresponding to the entire object field 14 (FIG. 1), the optical reconstruction of the sonograms appearing in the rear focal plane of the lens 136. The reconstructed image is imaged on the photocathode 138 of an image tube 140. The reconstructed image is then viewable on the screen 142 of the tube 140.

Referring now to FIGURE 5, there is shown a Gaussian emitter arranged according to the present invention for use as the acoustic wave transmitter 29 in the above-described sonography systems. As above mentioned, the transmitter 29 may be disposed at the forward-most tip of a submerged vessel and emits a narrow acoustic wave beam 30 for scanning the object field 14. The Gaussian emitter comprises a generally circular housing 150 which is terminated by an annular rim 152. Affixed to the opposite edges of the rim 152 are a semi-circular member 154 formed of a suitable liquid impervious and acoustically transparent material such as, for example, neoprene and a circular plate 156 extending across the opening defined by the rim 152. The area enclosed by the member 154 and the plate 156 is filled with a pressurized wave transmitting medium 158 which may be, for example, oil or water. The medium 158 is pressurized to provide at least a partial static equilibrium between the pressure of the wave transmitting medium 158 and the water surrounding the housing 150.

Mounted within the area defined by the rim 152, the member 154 and the plate 156 is a universal support member 160. The universal is coupled through a centrally located pin member 161 to a drive shaft 162 and is secured on opposite ends to a pair of push rods 164 and 166. The drive shaft 162 is driven by a variable speed motor (not shown) which rotates the shaft at an angular velocity of two and one-half revolutions a second with decreasing angular velocity when the universal 160 is tilted and increasing velocity when the universal is upright. This provides greater speed at the center of the beam, as will be apparent hereinafter. The push rods, which may be driven in any known and conventional manner, operate in complementary relationship to tilt the universal 160 as the universal is rotated by the shaft 162. Accordingly, the universal 160 both rotates and nutates to implement spiral scanning by the emitter 29, as will be apparent hereinafter.

Secured to the universal support member 160 by a pair of bolts 167 and 168 is a generally rectangular support plate 169 which is affixed at opposite ends to the thickened wall 170 of a hollow annular member 171. The upper edge of the wall 170 is tapered radially inwardly to form a ring 172 and welded to the ring 172 is a circular metal plate 173. Preferably, the metal plate is formed of steel and has a very small thickness, such as, for example, 1.50 millimeters. Also secured to the thickened wall 170 of the member 171 and spaced only a short distance from the circular metal plate 173 is a second metal plate 174. The metal plate 174 has a plurality of recesses formed therein within which a corresponding plurality of graded oscillators 176a, 176b ... 176n are situated. For very high frequencies, the oscillators may be any of the conventional types employing piezoelectric crystals whereas for frequencies at and below 20 kc./s., the oscillators may be electrodynamic loudspeakers. As shown, the spacing between the oscillators 176a ... 176n is similarly filled with the wave transmitting medium 158. As is understood, where oscillators of the piezoelectric crystal type are employed, the medium 158 must be oil and cannot be water.

When the oscillators are active, the plate 173 oscillates at the frequency of the acoustic waves generated by the oscillators and generates a pressure field which provides a Gaussian shaped acoustic beam without side lobes. The maximum amplitude or power density of the Gaussian beam occurs at the center of the plate 173 and then falls off rapidly to almost zero at the point where the plate 173 is welded to the ring 172. Preferably, the diameter of the circular plate 173 is six times the radial distance, $x_0$, between the point at which the amplitude is maximum and the point at which the amplitude is .606 the maximum amplitude. Specifically, where $x_0$ equals 10 centimeters, the diameter of the plate 173 is preferably 60 centimeters.

FIGURE 6 illustrates graphically the spiral scanning carried out by the emitter 29. When the universal 160 is rotated by the drive shaft 162 and simultaneously tilted by the push rods 164 and 166, and the oscillators 176a ... 176n are rendered operative, the oscillating plate 173 is rotated and nutated by the universal 160. The oscillating plate 173 is rotated at a velocity of two and one-half revolutions per second and one complete scan is completed in one second. The spacing between the turns is preferably 1.60 times the radius of the plate 173 to provide uniformity of scanning while the solid angle, $\theta m$, illuminated by the beam is preferably 30°.

Although the invention has been described herein with reference to specific embodiments, many modifications and variations therein will readily occur to those skilled in the art. For example, to effect the optical reconstruction of the object field 14 from the circular images appearing on the face of the cathode ray tube 120 of FIGURE 4, a modified eidophor may be employed. The eidophor operates like the photoplastic film 128 except that the photographic medium is an oil-like fluid carried by a rotating glass drum and the charges are modulated by depositing them by an electron beam and not by photoelectric effect. Accordingly, all such variations and modifications are included within the intended scope of the invention.

We claim:

1. A sonic system employing holographic techniques to produce a picture of an object field, comprising acoustic wave transmitting means for spirally scanning an object field with an acoustic wave beam having a predetermined frequency, a plurality of sound intensity receptors arranged in a predetermined array and responsive to the acoustic waves reflected off objects in each scanned portion of the object field for developing signals corresponding to the intensity of the reflected acoustic waves, a signal source for generating reference signals having a predetermined frequency and out-of-phase with the signals developed by the sound intensity receptors to simulate a reference beam which is outside the scanned portion of the object field, means for mixing the reference signals with the signals detected by the sound intensity receptors to provide joint intensity signals, means for converting the joint intensity signals into light beams in an array corresponding to the predetermined array and recording means responsive to successive arrays of light beams for producing a sonogram containing information corresponding to the objects in the scanned portion of the object field.

2. A sonic system according to claim 1 wherein the plurality of sound intensity receptors are arranged in a circular array and the joint intensity signals are converted into light beams arranged in circular arrays.

3. A sonic system according to claim 1 wherein the reference signal source comprises a pair of oscillators operating in quadrature for generating signals having a frequency equal to the frequency of the transmitted acoustic wave and phasor ring means responsive to the signals generated by the pair of oscillators for generating signals which are out-of-phase by half the field angle scanned by the transmitted acoustic wave with the signals developed by the sound intensity receptors.

4. A sonic system according to claim 1 wherein the means for converting the joint intensity signals into corresponding light beams comprises a source of light and light modulating means disposed in an array corresponding to the receptor array and responsive to the joint intensity signals for regulating the amount of light transmitted from the source of light.

5. A sonic system according to claim 4 wherein the light modulating means includes a modulating ring comprising a plurality of microshutters for directing light from the source of light into a plurality of parallel paths and magnetic actuator means responsive to the joint intensity signals respectively and operatively coupled to the plurality of microshutters for controlling the amount of light transmitted by each microshutter in accordance with the magnitude of the joint intensity signals respectively.

6. A sonic system according to claim 5 wherein the means responsive to the light beams for producing a sonogram comprises a movable photographic medium selectively exposed to the array of regulated beams of light at reduced scale, and developing means for developing the exposed medium to produce thereby a sonogram containing information regarding the objects in the scanned portion of the object field.

7. A sonic system according to claim 1 including means for illuminating a plurality of sonograms to reconstruct a picture of the entire object field comprising means for generating a beam of coherent light and directing the beam of coherent light toward a plurality of sonograms at an angle corresponding to the phase of the reference signals with respect to the detected acoustic waves to thereby illuminate the sonograms and implement the holographic reconstruction of a picture of the entire object field.

8. A sonic system according to claim 7 further comprising an image tube having a photocathode and a viewing screen and lens means alinged with the illuminated sonograms for imaging the reconstructed picture onto the photocathode of the image tube whereby the reconstructed image is viewable on the screen of the image tube.

9. A sonic system according to claim 1 wherein the means for converting the joint intensity signals into corresponding light beams comprises an array of charge storage means, movable transducer means sequentially coupled to each of the charge storage means for developing corresponding voltage signals and image reproducing means movable in synchronism with the transducer means responsive to the voltage signals for reproducing an image corresponding to the magnitude of the voltage signals.

10. A sonic system according to claim 9 wherein the charge storage means comprises stator ring means having discrete segments responsive to the corresponding joint intensity signals and the transducer means comprises rotating electrode means vibrated at high frequency and operatively coupled to each segment of the stator ring means in succession for developing successive voltage signals corresponding to the charge on each segment of the stator means.

11. A sonic system according to claim 10 wherein the image reproducing means comprises a cathode ray tube including an electron gun for scanning the face of the tube with an electron beam in response to the high frequency signals supplied to the grid of the tube and a rotating pair of magnetic poles operating in synchronism with the rotating transducer means for deflecting the electron beam whereby the electron beam scans a circular image on the face of the tube, the intensity of the components of the reproduced circular image being dependent upon the amplitudes of the voltage signals.

12. A sonic system according to claim 11 wherein the means responsive to the light beams for producing a sonogram comprises a movable photographic medium selectively exposed to each scanned circular image on the face of the cathode ray tube and developing means for developing the exposed medium to produce thereby a sonogram containing information corresponding to the objects in the scanned portion of the object field.

13. A sonic system according to claim 12 including means for illuminating a plurality of sonograms to reconstruct a picture of the entire object field comprising means for generating a beam of coherent light and for directing the beam of coherent light toward a plurality of sonograms at an angle corresponding to the phase of the reference signals with respect to the detected acoustic waves to thereby illuminate the sonograms and implement the holographic reconstruction of a picture of the entire object field.

References Cited

UNITED STATES PATENTS

| 2,528,725 | 11/1950 | Rines. | |
| 3,001,190 | 9/1961 | Fryklund. | |
| 3,284,799 | 11/1966 | Ross | 43—17 X |
| 3,400,363 | 9/1968 | Silverman | 340—3 |

OTHER REFERENCES

Preston et al., Applied Physics Letters, vol. 10, No. 5, Mar. 1, 1967, pp. 150–152.

RICHARD A. FARLEY, Primary Examiner

U.S. Cl. X.R.

181—0.5; 343—17, 7.9; 73—67.7